United States Patent
Mani (10) Patent No.: US 8,172,264 B2
(45) Date of Patent: May 8, 2012

(54) AUTOMOTIVE KNEE BOLSTER INSTALLATION AND METHOD OF CONSTRUCTION

(76) Inventor: Ayyakannu Mani, Rochester Hills, MI (US)

( * ) Notice: Subject to any disclaimer, the term of this patent is extended or adjusted under 35 U.S.C. 154(b) by 779 days.

(21) Appl. No.: 11/918,268

(22) PCT Filed: Mar. 30, 2006

(86) PCT No.: PCT/US2006/011641
§ 371 (c)(1),
(2), (4) Date: Jan. 21, 2009

(87) PCT Pub. No.: WO2006/113081
PCT Pub. Date: Oct. 26, 2006

(65) Prior Publication Data
US 2011/0115204 A1    May 19, 2011

(51) Int. Cl.
*B60R 21/045* (2006.01)
(52) U.S. Cl. .................. 280/752; 280/748
(58) Field of Classification Search .............. 280/752, 280/751, 748, 732, 728.2, 730.1
See application file for complete search history.

(56) References Cited

U.S. PATENT DOCUMENTS

| | | | | |
|---|---|---|---|---|
| 3,850,447 A * | 11/1974 | Nagazumi et al. | ............ | 280/752 |
| 5,096,223 A * | 3/1992 | Tekelly et al. | ............... | 280/748 |
| 5,273,314 A * | 12/1993 | Sakakibara | .................. | 280/752 |
| 6,145,880 A * | 11/2000 | White et al. | .................. | 280/752 |
| 6,609,727 B2 * | 8/2003 | Figlioli et al. | ................ | 280/752 |
| 6,702,324 B2 * | 3/2004 | Shimoyamada et al. | ..... | 280/752 |
| 6,948,738 B2 * | 9/2005 | Garnweidner et al. | ....... | 280/752 |
| 7,128,339 B2 * | 10/2006 | Mani | ............................. | 280/752 |
| 2003/0184070 A1 * | 10/2003 | Vidal et al. | .................... | 280/752 |
| 2004/0056463 A1 * | 3/2004 | Marks et al. | ................... | 280/752 |
| 2005/0194773 A1 * | 9/2005 | Yamada et al. | .............. | 280/752 |

* cited by examiner

*Primary Examiner* — Drew Brown
(74) *Attorney, Agent, or Firm* — John R. Benefiel (57) ABSTRACT

A knee bolster installation for an automotive vehicle includes a bridge plate extending across a space receiving a steering column in front of the driver's knee or a glove box in front of a passenger's knees and having a knee impact absorber structure attached behind each end of the bridge plate. Each knee impact absorber structure has diverging front and back walls having a curved top wall and a curved generally horizontal intermediate web extending between the front and back walls, and a curved bottom wall connecting the lower end of front and back walls together. A generally vertical stabilizer web connects the top wall and intermediate web together to restrain bulging when crushed to avoid horizontal collapse thereof during deformation. Offset openings in each of the top wall, intermediate web, and bottom wall form wider curved strips at the inside adjacent the steering column space so that the front of the outside ends of the knee installation absorber structures are inclined away from the steering column space when deformed by knee impact. The knee installation absorber structures are either extruded and the openings thereafter cut into the top wall, intermediate web and bottom wall, or formed from a flat strip of material into which openings are cut prior to forming the strip.

3 Claims, 10 Drawing Sheets

AUTOMOTIVE KNEE BOLSTER INSTALLATION AND METHOD OF CONSTRUCTION

BACKGROUND OF THE INVENTION

This invention concerns so called "knee bolsters", which are structures installed in automotive vehicles forward of the driver=s seat positioned to be engaged by the drive's knees if the person submarines below the steering wheel mounted air bag during a collision.

Such knee bolsters also can be of benefit to passengers seated on the passenger's side next to the driver.

Knee bolsters sometimes employ crushable or deformable impact absorbing structures which restrain a person by contact by his or her knees, the crushing of the structure absorbing the energy of the person=s momentum over a range of deformation to lower the stress on the person=s knees and the load transmitted to the thigh bone.

Deformable structure knee bolsters are designed to be controllably collapsed by the person as the person is decelerated by the collision in order to reduce or prevent injury to the person.

Another requirement is the prevention of damage to or interference with the steering column mechanism during collapse of the knee bolster impact absorbing structure so as to to allow steering control to be maintained, if possible.

Costs are always a problem in automotive design, and the knee bolsters have sometimes been assembled from a number of components, which adds to the cost of manufacture.

Large aluminum sections have been proposed to be extruded to eliminate assembly costs, with portions cut out from the large extrusions. Large extrusions are themselves costly such that these structures are still somewhat expensive to manufacture.

Other knee bolsters have involved crush cells which have curved webs which are deformed, but such webs have a geometry which results in a buckling collapse of the web, greatly reducing the structure=s ability to absorb energy. This can result in a great reduction in the restraining effect of the structure. Such collapse can also produce gross bulging which can interfere with proper operation of the steering mechanism. Also, such a collapse mode can cause the surface impacted by the knees to directly hit the steering column and also may hinder the proper functioning of the steering column.

It is the object of the present invention to provide a deformable structure type knee bolster which is low in cost yet reliably produces adequate resistance to deformation over a range of movement of a person being decelerated, and prevents the development of any interference with the steering column mechanism.

SUMMARY OF THE INVENTION

The above objects and others which will become apparent upon a reading of the following specification and claims are achieved by a knee bolster comprised of a right and left laterally spaced knee impact absorber deformable structures fixed on a respective side of a steering column or, on the passenger's side on either side of a glove box, with a knee engagement plate or glove box door bridging the space between the knee impact absorber structures.

Each knee impact absorber structure is a section extruded from plastic, aluminum or other extrudable material or alternatively formed from a strip of such material, the structure comprised of an outer wall having generally planar front and back sides extending in a generally V-shape, with the lower end of the divergent front and back walls connected by a curved bottom wall. A double curved top wall connects the upper ends of the front and back walls. A vertical stabilizer web connected to the double curved top wall extends down to an intermediate double curved web extending between the back and front walls at an intermediate height on the structure. A series of openings are cut into the top, intermediate, and bottom walls to create inner and outer strips.

This geometry creates an upper stabilizer comprised of a pair of crush cells having curved top and bottom sets of strips connecting each of the upper part of the back and front walls of the structure to a respective side of the horizontal stabilizer web.

A lower stabilizer is formed by the curved bottom strips and the lower part of the back and front walls.

The left and right knee impact absorber structures are connected to either end of a separately formed flat bridge plate which is located at the front of the bolster to be engaged by the driver=s knees when a collision occurs.

A glove box door can act as a bridging plate on a passenger side installation.

Sets of inner strips adjacent a space through which the steering column or glove box bin extends are wider than outer strips adjacent the outer side, that slope outwardly away from the steering column so that the front and back walls are collapsed together at their outer sides when the knees force the bridge plate to bend to deform the knee impact absorber structures, creating a wedge shape guiding the knees away from the center and avoiding the intrusion of any part of the deformed knee structures into the area of the steering column or glove box.

Outward buckling collapse of the outer strips is prevented by the restraining effect of the upper stabilizer web so that resistance to deformation is sustained throughout the crush event.

In other embodiments, each knee impact absorber structure is comprised of slightly angled, nearly parallel straight outer front and back side walls defining a space subdivided into cells by partitions comprised of a parallel intermediate web, curved webs and end walls. Openings can be formed in the partitioning walls to control the crush strength of the structure. Grooves extending across the inner surface of the walls can also be included for this purpose.

In still other embodiments, individual cell walls created by forming sheet material are attached to each other as by spot welding to create a multi-cell knee impact absorber structure.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
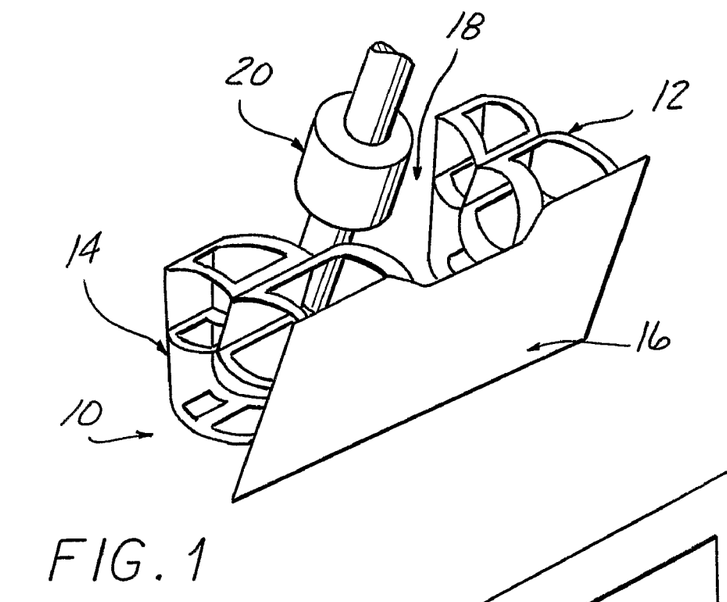
FIG. 1 is a pictorial view of a complete knee bolster installation according to the invention.
Figure 1A:
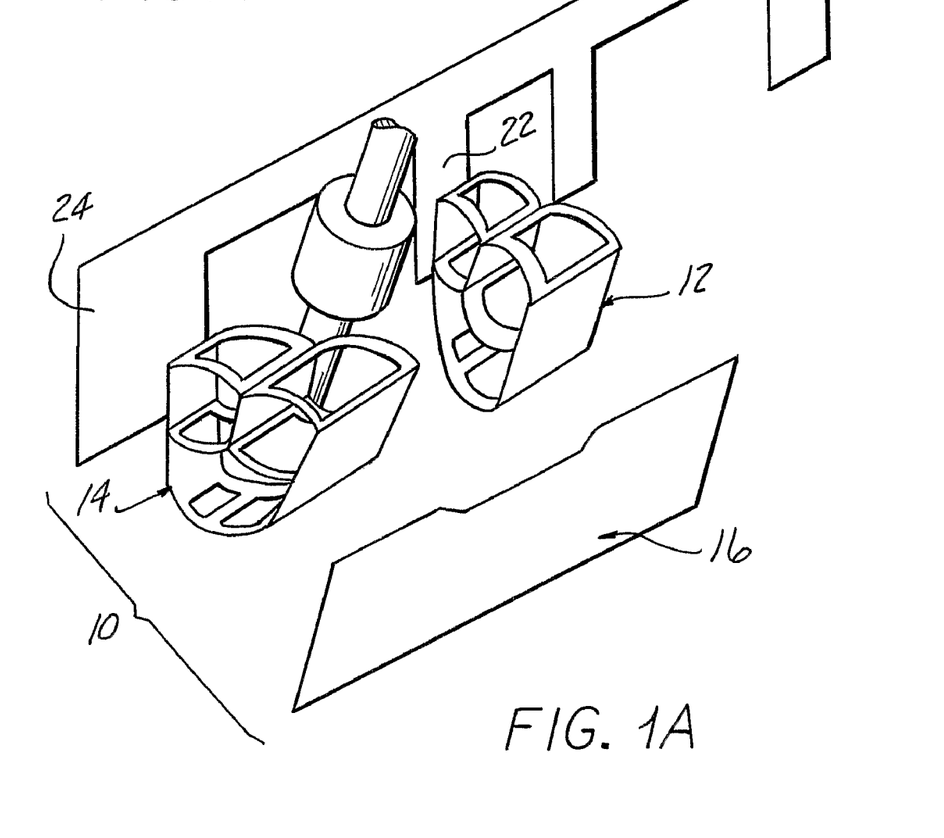
FIG. 1A is an exploded pictorial view of the knee bolster installation shown in FIG. 5.

Referring to the drawings, and particularly FIGS. 1 and 1A, the knee bolster 10 according to the present invention includes a right knee impact absorber structure 12 and a left knee impact absorber structure 14, both attached to a respective end of a bridging plate 16 extending between the driver=s seat and the structures 12 and 14 and facing the driver=s knees. A space 18 between the absorber structures 12, 14 accommodates the steering column 20 of the vehicle in which the knee bolster 10 is installed.

The absorber structures 12 and 14 are each restrained by fixed vehicle body structure 24 depicted diagrammatically forward of the knee bolster 10.

Figure 2:
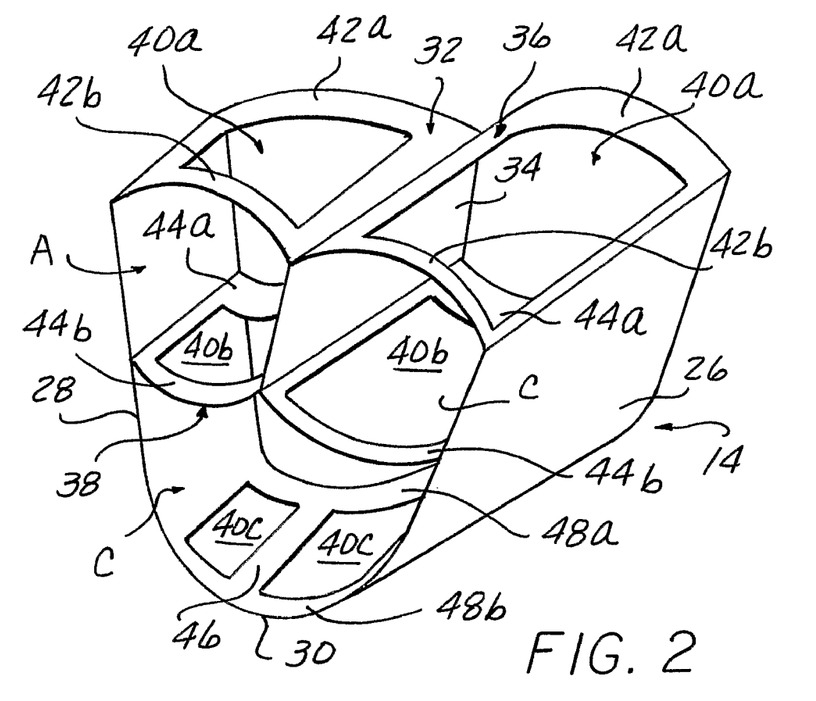
FIG. 2 is an enlarged pictorial view of the left knee impact absorber structure used in the knee bolster according to the invention.

FIG. 2 shows details of the left knee impact absorber structure 14. The knee impact absorber structures 12 and 14 need not be identical, as differing crush characteristics thereof are sometimes necessary or desirable, but are contemplated as having the same general configuration according to the present invention.

The left impact absorber structure 14 has a wider front wall 26 and a narrower back wall 28 which are spaced apart and extend generally vertically but which diverge from each other in the direction towards their upper ends as shown in the drawings. The lower ends thereof are connected together by a curving bottom wall 30.

At their upper ends, the front and back walls 28, 30 are connected together by a curved top wall 32 having two curved segments. A stabilizer web 34 extends generally vertically down from the joint 36 between the curved segments of the top wall 32 to a generally horizontal intermediate wall 38, also having two curved segments forming a pair of connected upper crush cells A and B. Each of the top, intermediate and bottom walls 32, 38, 30 are pierced and cut to form pairs of openings 40a, 40b, 40c, therein. These openings can be of any shape and can incorporate rounded corners.

These openings are offset to the left to create outwardly curved top side strips 42a at the right side of adjacent the space 18 which are wider than similar intermediate curved strips 42b at the left.

Intermediate curved strips 44a, 44b are formed in the intermediate wall 38 by openings 40b, with right side strips 44a adjacent the space 18 wider than the left side strips 44b.

A lower crush cell C is formed by the outwardly curved bottom wall 30, the lower portions of the front and back walls 28, 30, and the curved strips 44.

A strip 46 between the openings 40c provides a stabilizer function for bottom curved side strips 46a, 46b.

Figures 3A, 3B:
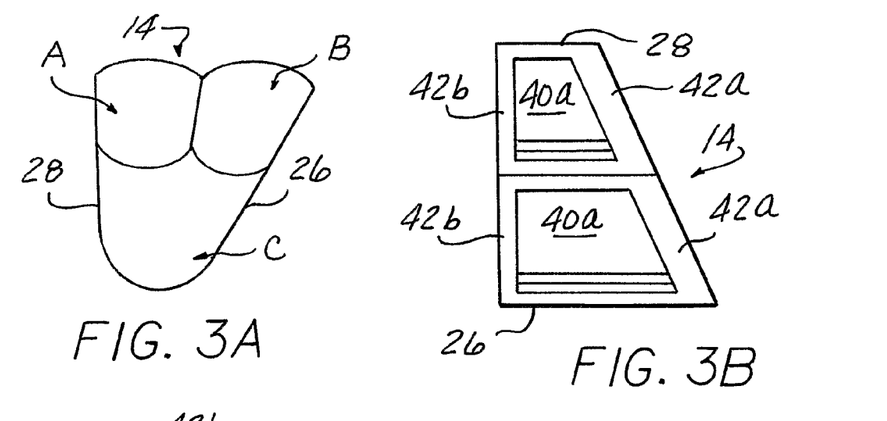
FIG. 3A is a side view of the knee impact absorber structure shown in FIG. 2.
FIG. 3B is a top view of the knee impact absorber structure shown in FIG. 2.
Figure 3C:
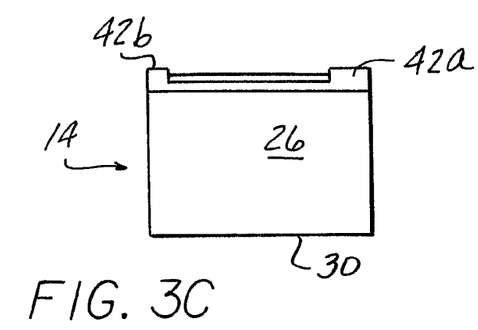
FIG. 3C is a front view of the knee impact absorber structure shown in FIG. 2.
Figure 4:
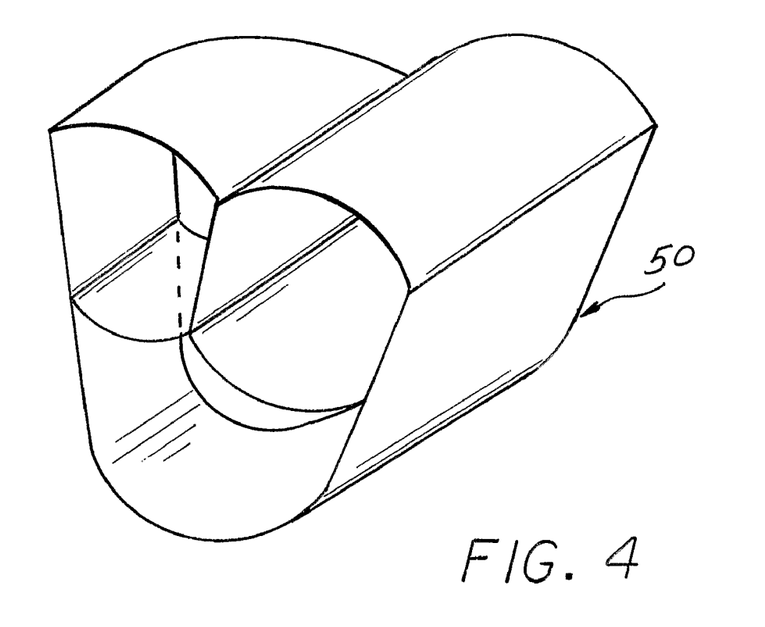
FIG. 4 is a pictorial view of a preform used to construct the knee impact absorber structure shown in FIG. 2.

As best seen in FIG. 3b, the inner side, closest to the space 18, is angled so that the front wall 26 is substantially wider than the back wall 28.

Figure 5A:
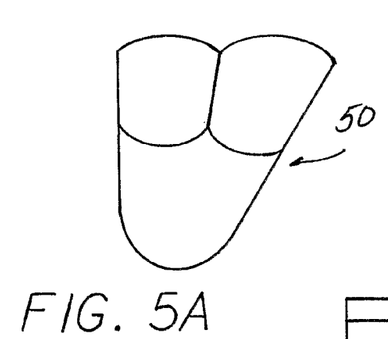
FIG. 5A is a side view of the preform shown in FIG. 4.
Figure 5B:
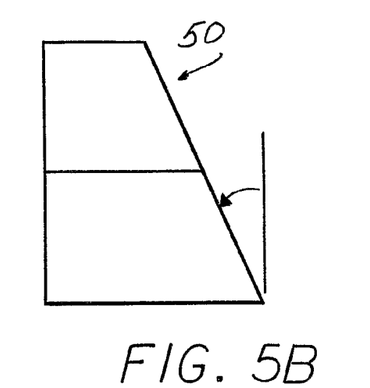
FIG. 5B is a top view of the preform shown in FIG. 4, with an indication of the angle from front to rear of the inner side thereof.
Figure 5C:
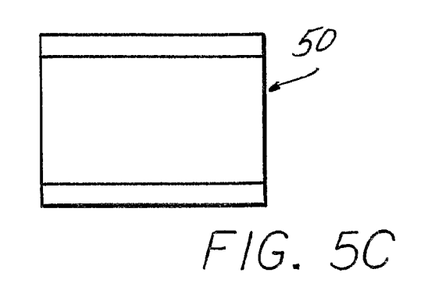
FIG. 5C is a front view of the preform shown in FIG. 4.

FIGS. 4 and 5A-5C show a preform 50 from which the knee impact absorber structures 12, 14 can be made from an extrusion, and by piercing or drilling or cutting (laser beam, water jet, for example) the various openings, and cutting the angled inside as indicated in FIG. 5B.

Figures 6A, 6B:
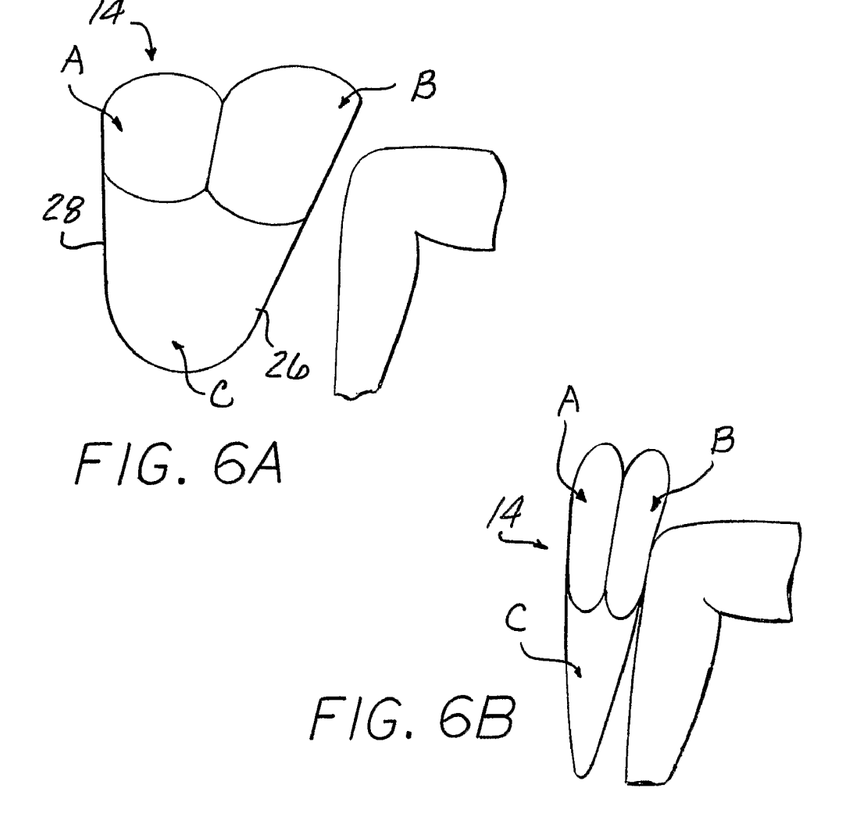
FIG. 6A is a diagram showing a side view of one of the knee impact absorber structures and a juxtaposed knee of the driver prior to impact.
FIG. 6B is a diagram according to FIG. 6A depicting the after deformed condition of the knee impact absorber structure.

FIGS. 6A and 6B show the controlled deformation of the left and right knee impact absorber structures 12 and 14 occurring during a knee impact event, with the diverging front and rear walls 26, 28 swinging together to crush the A, B, and C cells, the curved strips 42, 44, 48 bowing together.

Figure 7A:
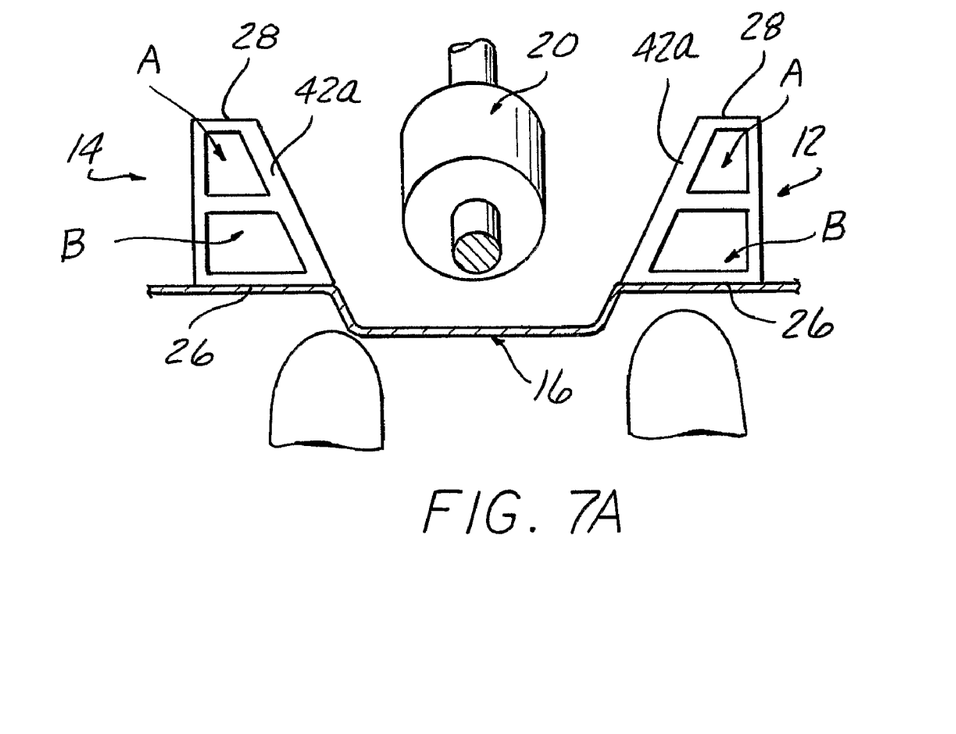
FIG. 7A is a plan view diagram of the knee bolster according to the invention depicting a driver=s knee and the steering column prior to impact.
Figure 7B:
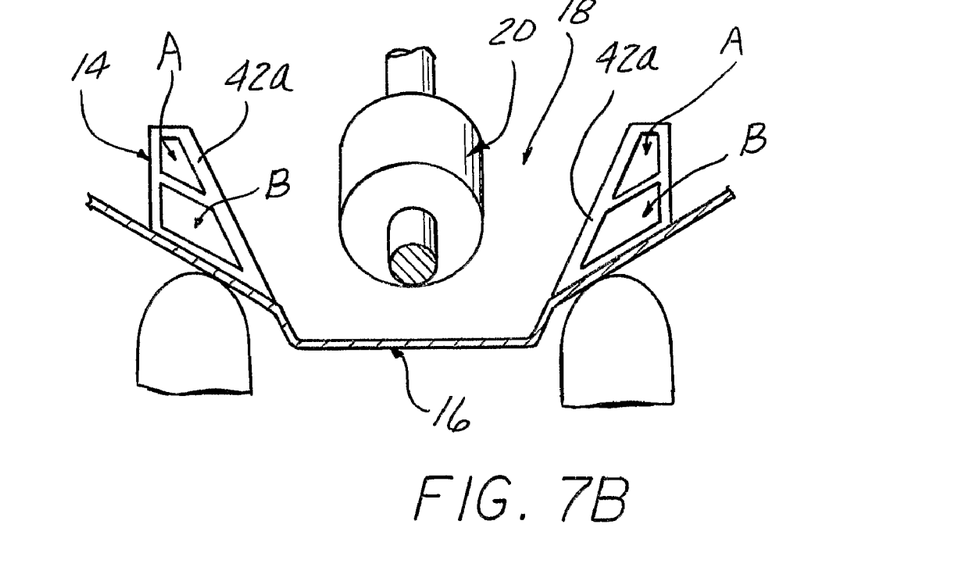
FIG. 7B is a diagram according to FIG. 7A depicting the after impact condition of the knee impact absorber structure.

FIGS. 7A and 7B show from the top further details of the exact mode of crush of the upper cells A, B.

The outer end of the front wall 26 is pushed back by deformation of the attached portion of the bridge plate 16.

This creates an outwardly angled surface guiding the driver=s knees away from the steering column space 18. The wider inside strips 42a, 44a, 48a restraining deformation thereof to create the angled deformation shown.

Figure 8:
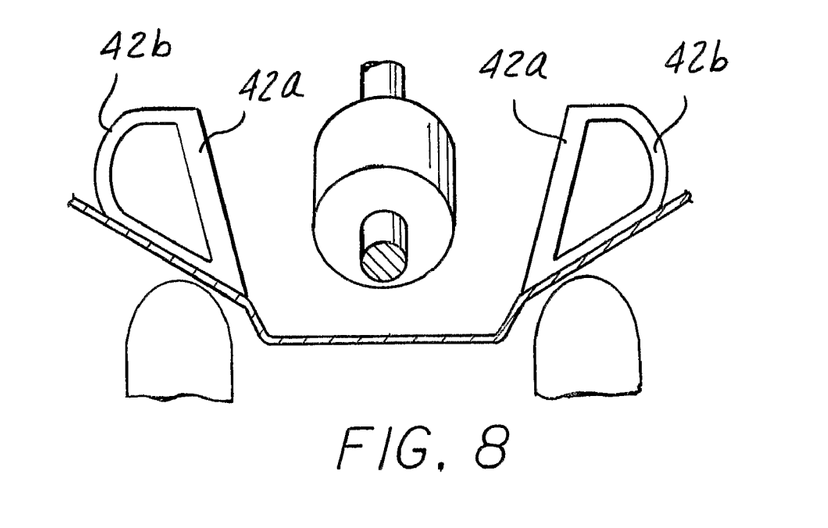
FIG. 8 is a diagrammatic depiction of the after impact condition of the knee impact absorber structure if the horizontal stabilizer web is omitted.

The stabilizer webs 34, 46 restrain outward bulging of the strips 42b, 44b, 48b to prevent collapse which would otherwise occur, as shown in FIG. 8 without the stabilizer webs. This insures a controlled resistance through the range of deformation without a buckling collapse which if occurring would limit the ability of the structures 12, 14 to absorb the kinetic energy of the driver.

Figure 9:
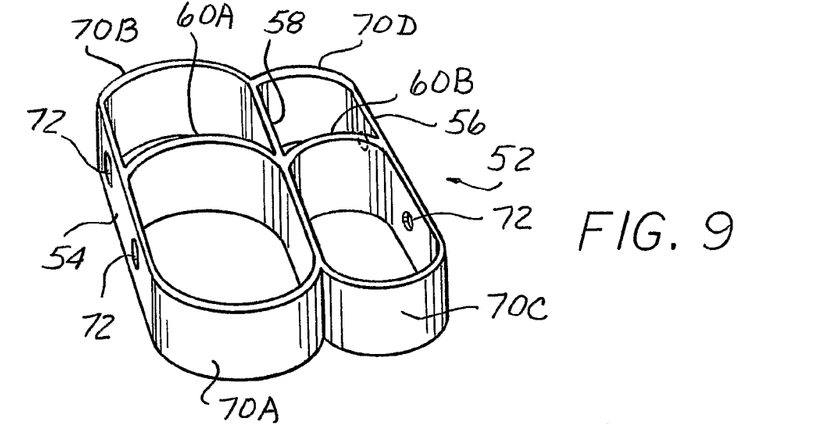
FIG. 9 is a pictorial view of a first alternate embodiment of a knee impact absorber structure according to the invention.

FIG. 9 shows a first alternate embodiment 52 of a knee impact absorber structure comprised of slightly angled, nearly parallel straight front and back side walls 54, 56 defining an interior space and a parallel generally horizontal intermediate web 58 and curved end webs 60A, 60B and end walls 70A, 70B, 70C, and 70D. Suitable mounting holes 72 are provided. This produces four cells of different sizes.

Figure 10:
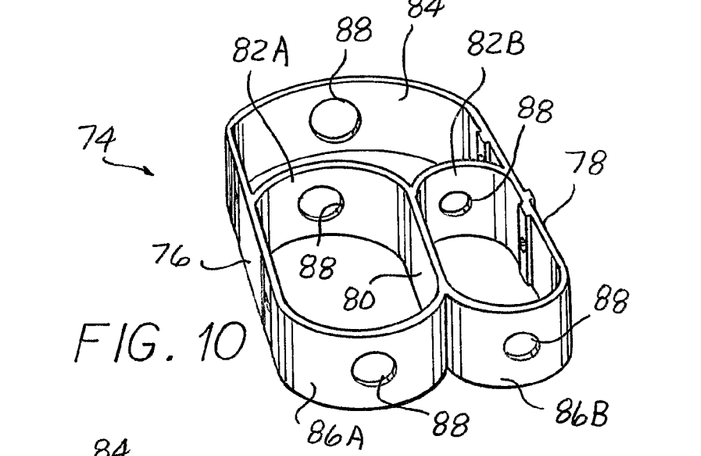
FIG. 10 is a pictorial view of a second embodiment of a knee impact absorber structure according to the invention.

FIG. 10 shows a second alternate embodiment of a knee impact absorber structure 74 also having nearly parallel front and back side walls 76, 78 defining an interior space and subdivided into three cells by an interior parallel web 80 shorter than the full height of the structure. Curved webs 82A, 82B are provided with curved end walls 84 and 86A, 86B completing the three cells.

Weakening holes 88 can be formed with curved webs 82A, 82BB and end walls 84, 86A, 86B to create a desired crush strength.

Figure 11:
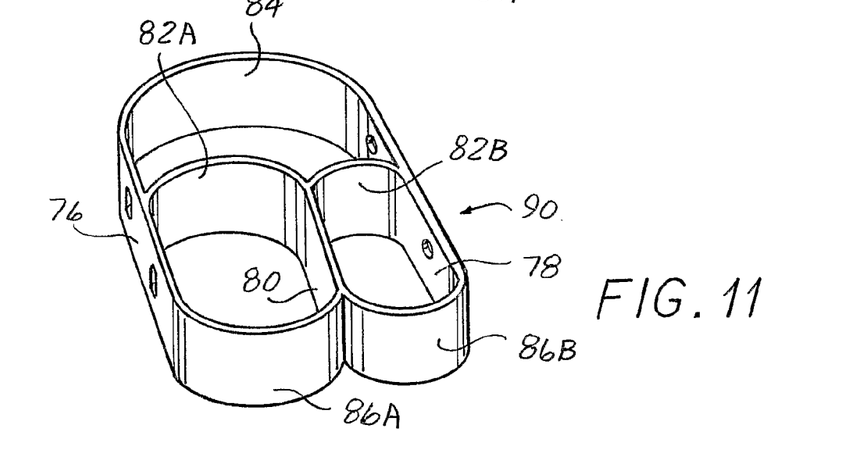
FIG. 11 is a pictorial view of a third alternate embodiment of a knee impact absorber structure according to the invention.

FIG. 11 shows a similar knee impact absorber structure 90 without the weakening holes.

Figure 12:
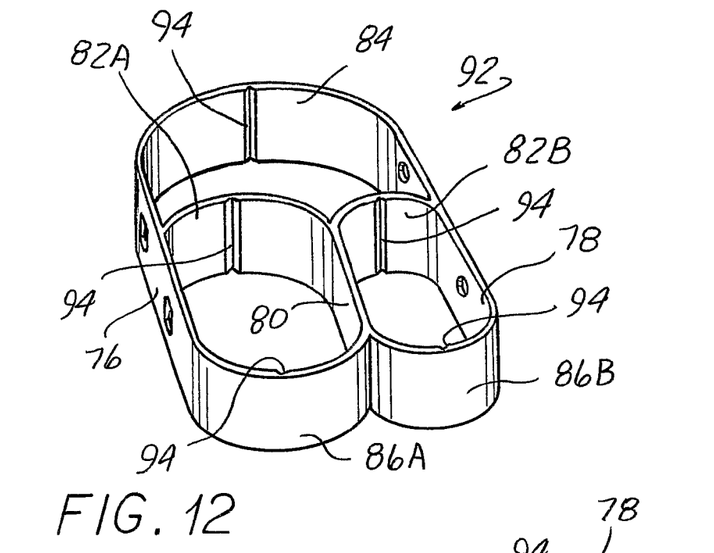
FIG. 12 is a pictorial view of a fourth alternate embodiment of a knee impact absorber structure according to the invention.
Figure 13:
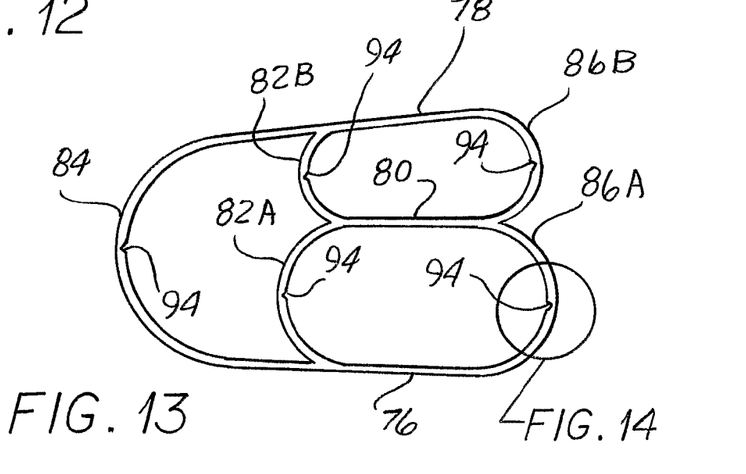
FIG. 13 is an end view of the embodiment of the knee impact absorber structure shown in FIG. 12.
Figure 14:
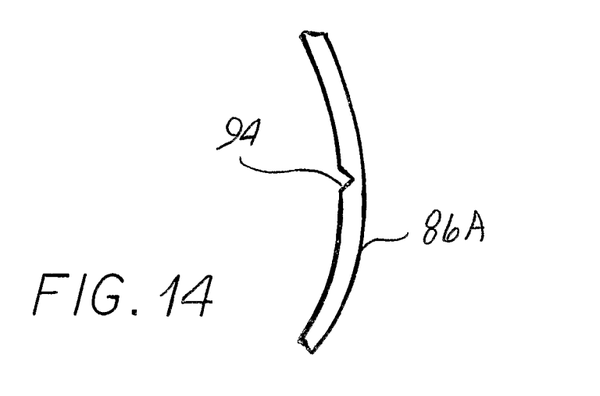
FIG. 14 is an enlarged fragmentary view of a portion of the structure shown in FIG. 13.

FIG. 12 shows a similar knee impact absorber structure 92 but formed with weakening grooves 94 extending across the width of the inner surface of the curved end walls 84, 86A, 86B, and curved webs 82A, 82B of a depth and width selected to produce a desired overall crush strength.

Thus, a simple low cost but quite effective knee bolster installation is provided.

Figures 15, 16:
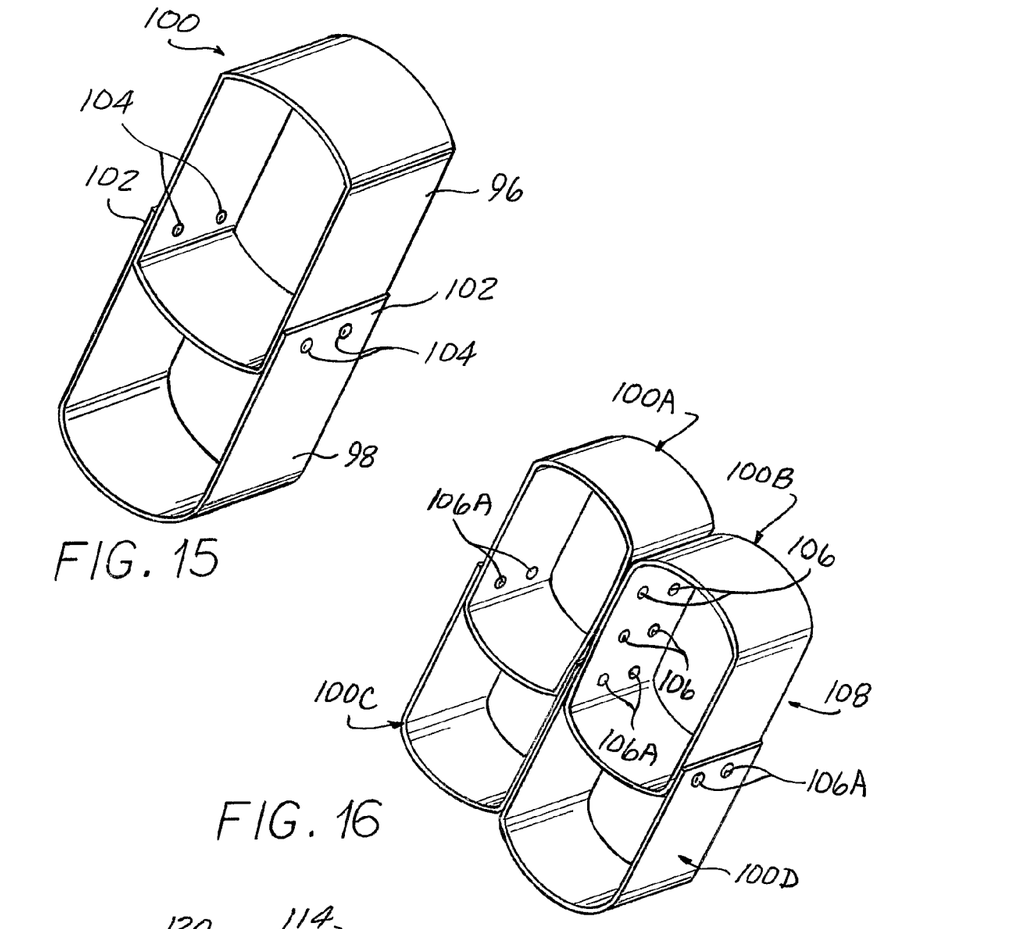
FIG. 15 is a pictorial view of a fifth alternate embodiment of a knee impact absorber structure according to the invention.
FIG. 16 is a pictorial view of a fifth alternate embodiment of a knee impact absorber structure according to the invention.
Figure 17:
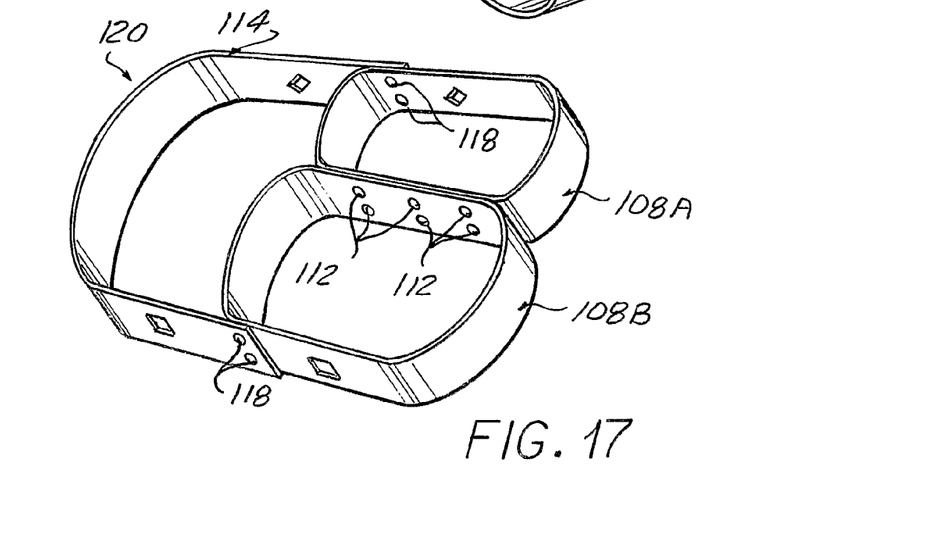
FIG. 17 is a pictorial view of a fifth alternate embodiment of a knee impact absorber structure according to the invention.

FIGS. 15-17 show alternate constructions.

In FIG. 15, an individual closed cell 96 is joined to a U shaped open cell 98 to form a two cell structure 100. This is accomplished by providing an overlap of the walls of the open cell 98 onto the walls of cell 96 at 102 with spot welds 104 joining the same together.

FIG. 16 shows two cell structures 100A, 100B fastened together by spot welds 106 joining abutting walls together. Two open cells 100C, 100D have legs overlapping the walls of the closed cells and are connected thereto with spot welds 106A to form a four cell structure 188.

FIG. 17 shows two single cells 100A, 100B of different size with spot welds 112 connecting abutting walls together. A large open cell 114 has legs overlapping the outer walls of each of the cells and attached thereto by spot welds 118. Thus, a single large extrusion is not required by this built up construction of small cells to form a three cell structure 120.

FIGS. 18-21 show further details of steps in fabricating a knee impact absorber structures without using an extrusion process.

Figure 18:
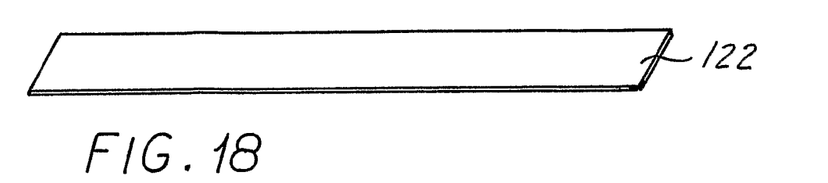
FIG. 18 is a pictorial view of a narrow sheet of material cut to size to be formed into a knee impact absorber structure according to the invention.

In FIG. 1, a strip of sheet material 122 is cut to size, of a width corresponding to the depth of the structure to be formed and of a length necessary to form the various cells.

Figure 19:
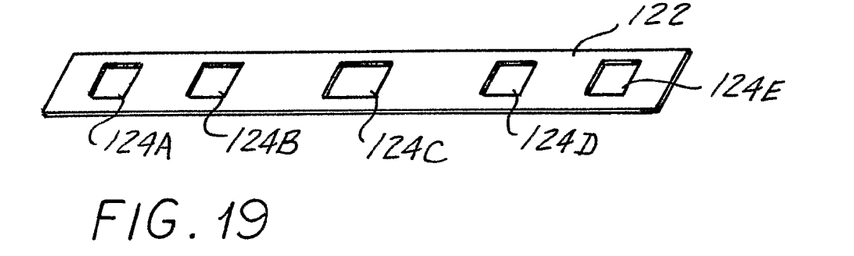
FIG. 19 is a pictorial view of strip of material shown in FIG. 18 with openings cut therein.

In FIG. 19, a series of cutouts 124A-124E are cut into the unformed strip 122 of a size and at locations to properly position weakening openings in the cell walls to be formed. This cutting can be done by various conventional methods, i.e. sawing, die cutting, laser, water jet, etc.

Figures 20A, 20B, 21:
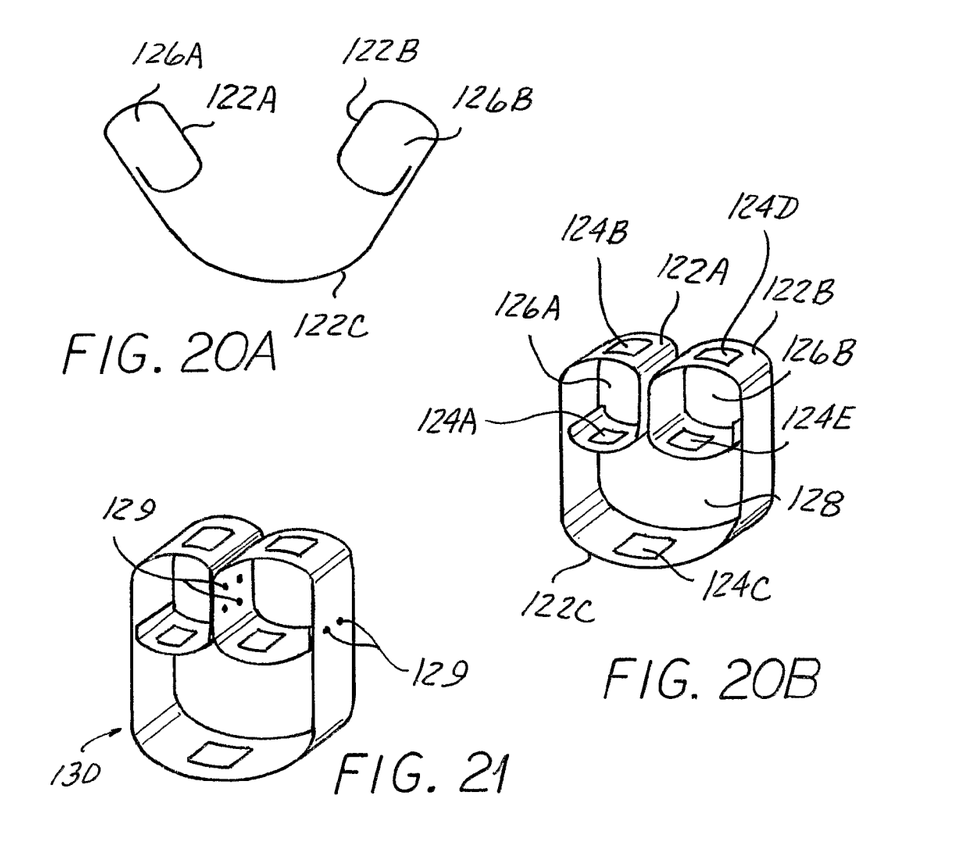
FIG. 20A is an end view of the partially formed strip of material.
FIG. 20B is a pictorial view of an additionally formed strip of material
FIG. 21 is a pictorial view of a completed knee impact absorber structure made by the steps shown in FIGS. 18-20B.

FIG. 20A, the ends 122A, 122B the ends of the strip 122 are formed over to create closed cells 126A, 126B.

In FIG. 30B, the intervening section 122C is formed into a partially curved shape to bring the inside walls of the cells 126A, 126B into abutment, forming a third cell 128.

In FIG. 21, the lapped and abutting walls have been welded or otherwise bonded as with an adhesive together to form a three cell structure 130.

Figure 22A:
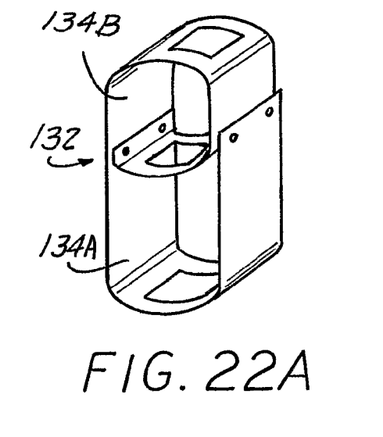
FIG. 22A is a pictorial view of an alternate form of the knee impact absorber structure according to the invention.

FIG. 22A shows a two cell structure 132 with a large lower cell 134A and upper smaller cell 134B, which can be made by the same general construction techniques.

Figure 22B:
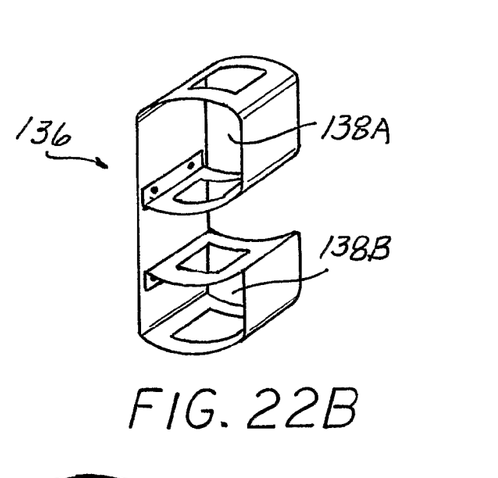
FIG. 22B is a pictorial view of another alternate form of a knee impact absorber structure according to the invention.

FIG. 22B shows a two cell structure 136, with two separated cells 138A, 138B.

Figure 23A:
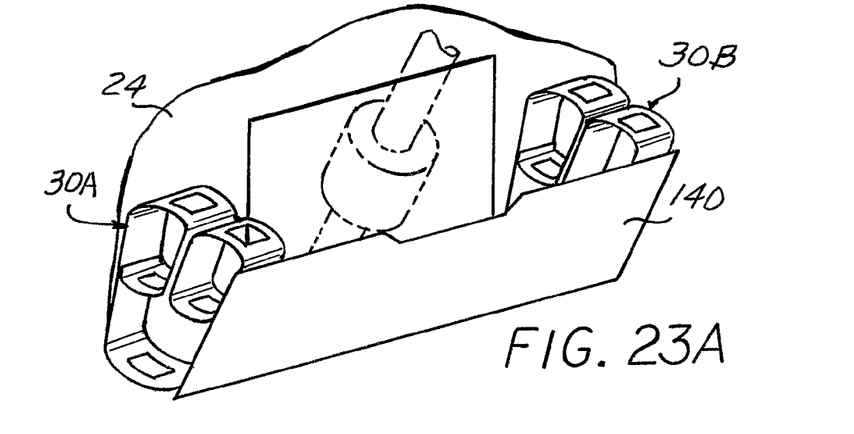
FIG. 23A is a pictorial view of a knee impact absorber structure made by the steps shown in FIGS. 18-20B installed in the driver's side of a vehicle compartment.
Figure 23B:
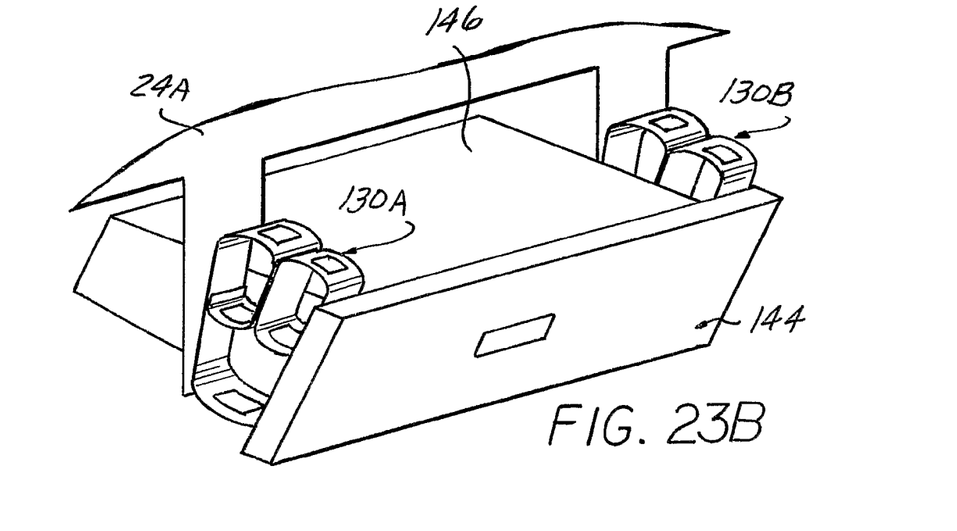
FIG. 23B is a view of the structures shown in FIG. 23 installed on the vehicle passenger side.

FIGS. 23A and 23B show impact absorber installations incorporating two knee impact absorber structures 130.

In FIG. 23A, a driver's side knee bolster installation is formed by two knee impact absorber structures 130A, 130B are mounted forwardly of a reaction plate 140, the structures 130A, 130B straddling a vehicle steering column 142. A fixed vehicle body structure 24 restrains the structures 130A, 130B.

FIG. 23B shows a passenger side knee bolster installation in which two structures 130A, 130B are mounted forwardly of a glove box door 144, straddling a glove box bin 146. Fixed vehicle body structure 24 restrains the structures 130A, 130B.

The invention claimed is:

1. A vehicle knee bolster installation for an automotive vehicle having:
    a glove box bin and covering door adapted to extend across a space forward of a passenger's knees, said installation comprising:
    a pair of spaced apart knee impact absorber structures each interposed between said glove box door and fixed vehicle structure forward of said glove box door;
    each of said knee impact absorber structures comprising a front and a back wall, each wall generally planar and extending generally vertically said front wall attached to said glove box door, a curved top wall connecting upper ends of said front and back walls; and
    a curved bottom wall connecting bottom ends of said front and back walls, and a curved generally horizontal intermediate web connecting said front and back walls of each of said knee impact absorber structures at an intermediate vertical location thereof to form a plurality of structure cells within said walls;
    a generally vertical stabilizer web located between said front and back walls and extending along the depth thereof connecting said curved top wall and said curved intermediate web to form two crush cells above said intermediate web to restrain excessive bulging and collapse of said top wall and intermediate web thereof upon impact.

2. The knee bolster installation according to claim 1 wherein openings are formed in said top and bottom walls and in said intermediate web.

3. The knee bolster installation according to claim 1 wherein openings are formed in said top and bottom walls and in said intermediate web.

* * * * *